Figure 8:
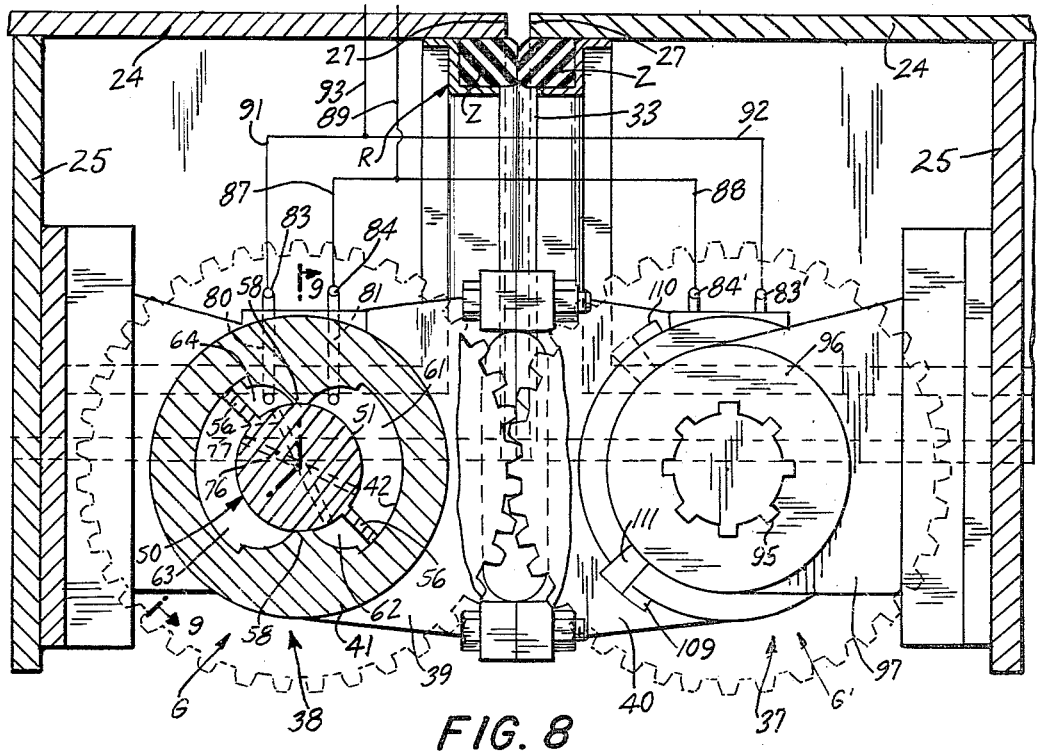

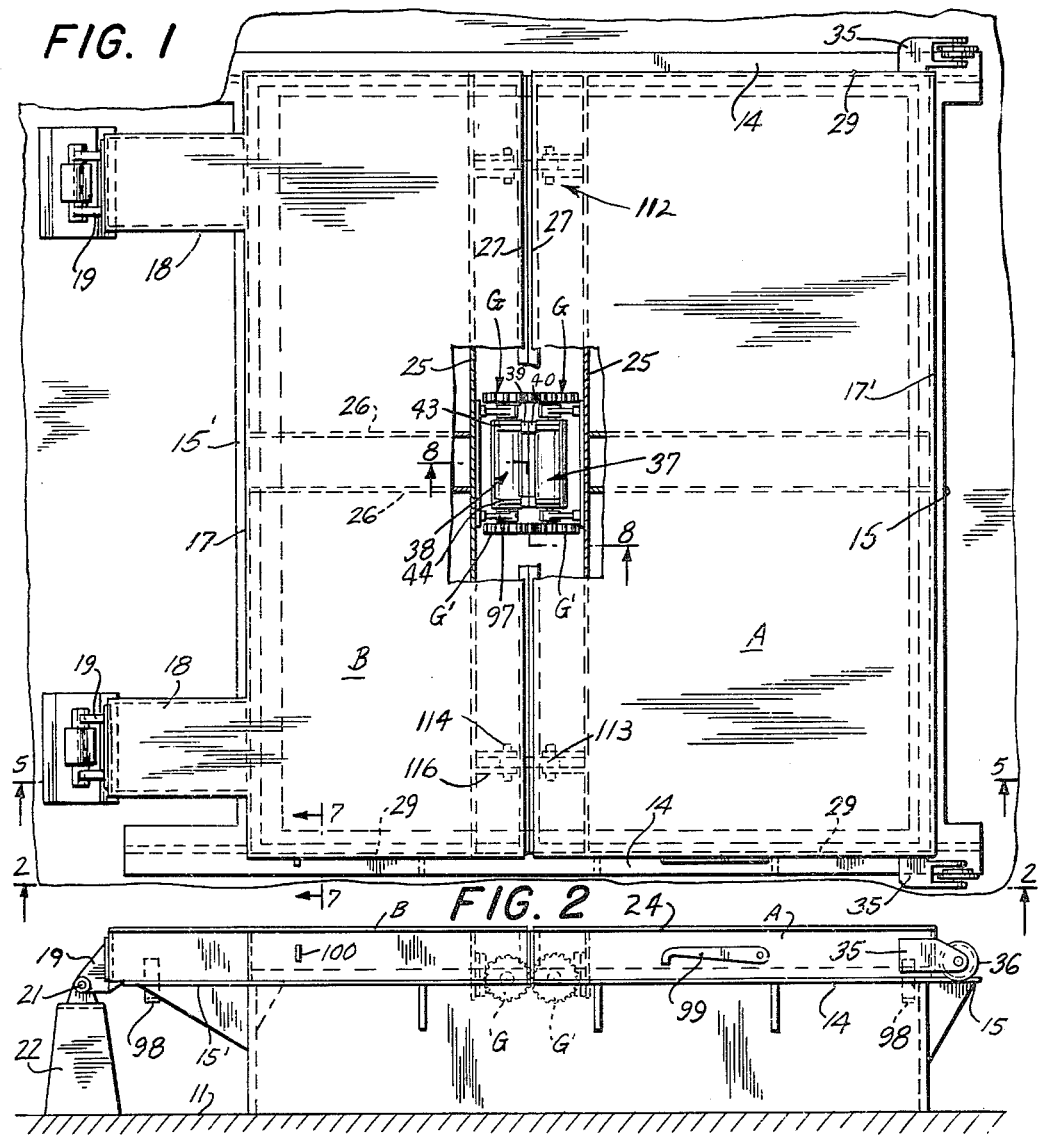
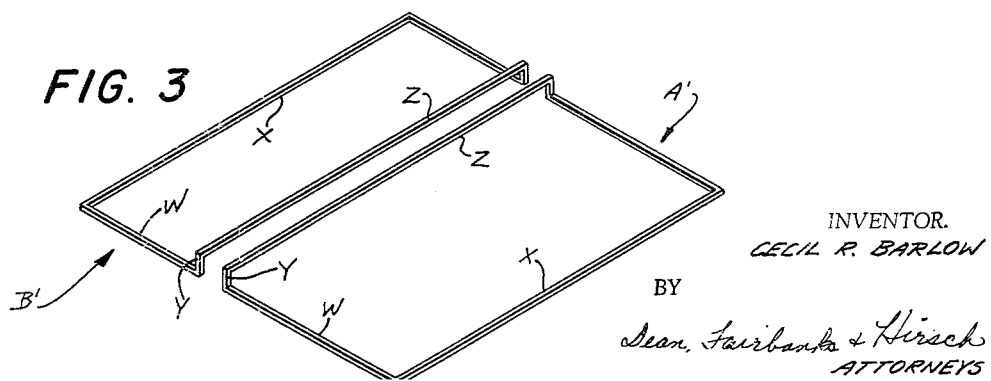

Oct. 12, 1965   C. R. BARLOW   3,211,122
POWER OPERATED HATCH COVER ASSEMBLY
Filed Dec. 24, 1963   3 Sheets-Sheet 2
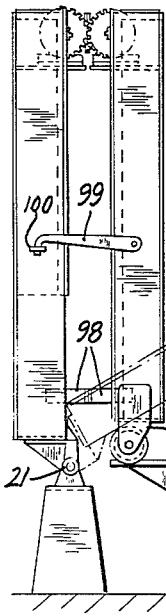
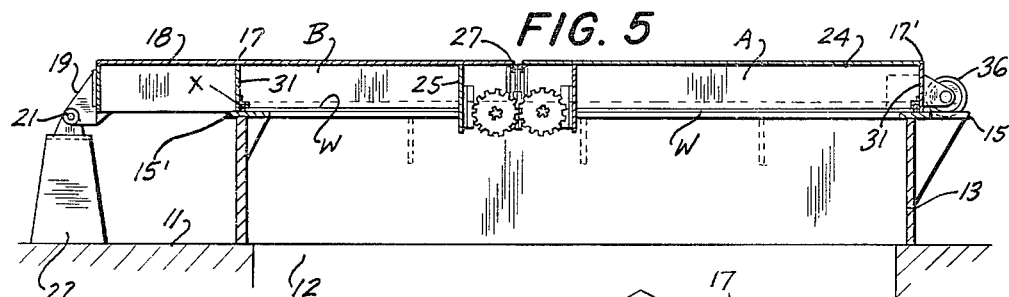
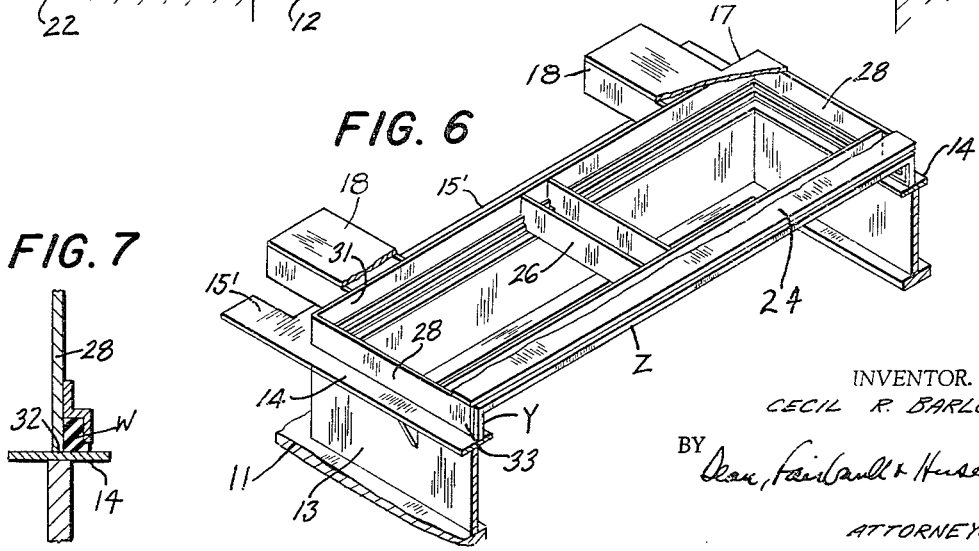
INVENTOR.
CECIL R. BARLOW
BY
ATTORNEYS United States Patent Office 3,211,122
Patented Oct. 12, 1965

3,211,122
POWER OPERATED HATCH COVER ASSEMBLY
Cecil R. Barlow, Allentown, Pa., assignor to Fuller Company, Catasauqua, Pa., a corporation of Delaware
Filed Dec. 24, 1963, Ser. No. 333,017
9 Claims. (Cl. 114—202)

This invention relates to the art of power operated hatch cover assemblies and more particularly to hatch cover assemblies having hydraulically operated actuating means for effecting opening and closing movement of the covers.

As conducive to an understanding of the invention, it is noted that there are many types of hatch cover arrangements embodying a pair of substantially rectangular panels which are designed to be positioned in substantially horizontal side by side relationship over the hatchway in closed position and in substantially vertical arrangement in the open or booked position, with one of the panels being connected by a fixed hinge to one end of the hatchway, and hydraulic actuator means for moving the covers between the closed and open positions.

Where the hydraulic actuators employed have portions that protrude beyond the confines of the hatch cover in the open position thereof, greater stowage space would be required than in constructions in which the actuators are completely within the confines of the hatch covers, and in addition the actuating means would be exposed to possible injury and damage during loading and unloading of cargo. Where portions of the actuating means protrude substantially below the maximum vertical depth of the hatch cover when the latter is in closed position, the effective cargo space in the hatch would be correspondingly reduced.

Where the actuating means, in moving the panels between open and closed position, permits movement of the panels at different rates of speed or at different times during the operation, so as to cause relative vertical movement of adjacent edges of the pair of panels, if such edges abut against each other, jamming of the panels during operation thereof may occur.

Where the hatch cover is of the watertight type having abutting gaskets on the adjacent edges of the pair of panels, and such relative vertical movement of adjacent edges of the panels occurs, the gaskets on such edges will also move vertically with respect to each other and the rubbing action imparted to the gaskets would quickly tear them from their retainers with subsequent failure of the watertight seal.

Where the arrangement of the hydraulic actuating means results in forward movement of one of the panels of a pair of hatch cover panels away from the fixed hinge of the assembly during its initial opening movement and two pairs of hatch cover panels movable in opposed directions are provided to cover a single hatchway, then in such case the adjacent edges of each of said pairs would abut, with possible damage to the panels, and in addition where gaskets are employed between adjacent pairs of panels to effect a watertight seal, such forward movement may compress such gaskets to the point of destruction. If a gap is provided between the adjacent edges of the innermost panel of each pair of panels to prevent damage due to forward movement of the panels during opening movement, then of course no watertight seal would be effected and furthermore a large gap is undesirable in that wheels of cargo moving equipment such as fork lifts, moving over the closed panel may jam and furthermore such gaps may cause tripping of crew members walking over the closed covers.

It is accordingly among the objects of the invention to provide a hatch cover assembly in which hydraulic actuators are employed to effect movement of the panels between open and closed position and in which said actuators will be substantially completely within the confines of the panels when the latter are in fully open or closed position and in which adjacent edges of said panels will be precluded from abutment during opening and closing of said panels thereby preventing possible jamming of said panels and resultant failure of operation of the hatch covers.

Another object of the invention is to provide a watertight hatch cover assembly of the above type having abutting gaskets on adjacent edges of the hatch cover panels, which hatch cover assembly utilizes rotary hydraulic actuating means to effect movement of the adjacent pairs of panels between open and closed position and in which the panels of each pair will move simultaneously and at the same rate of speed between open and closed position without relative movement in a vertical plane of the adjacent abutting gaskets with respect to each other.

Another object is to provide a hatch cover assembly of the above type in which the forward movement of the panel remote from the fixed hinge, during initial opening movement will be substantially reduced if not completely eliminated.

According to the invention, these objects are accomplished by the arrangement and combination of elements hereinafter described and more fully recited in the claims.

Figure 9:
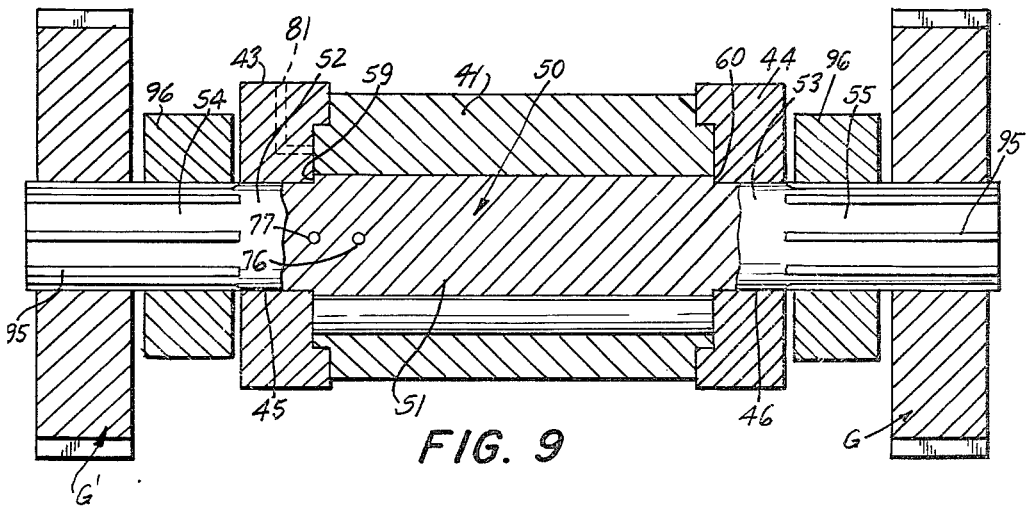

In the accompanying drawings in which is shown one of various possible embodiments of the several features of the invention, FIG. 1 is a plan view of a hatch cover assembly with the covers in closed position and with a portion of the panel top plates removed, FIG. 2 is a side elevational view of the hatch cover assembly taken along line 2—2 of FIG. 1, FIG. 3 is a diagrammatic perspective view of the gasket strips for the panels, FIG. 4 is a side elevational view of the hatch cover assembly with the panels in fully open position and in broken lines showing the panels betwen open and closed positions, FIG. 5 is a sectional view taken along line 5—5 of FIG. 1, FIG. 6 is a fragmentary perspective view of a portion of the hatch cover assembly showing the coaming and a portion of one of the hatch cover panels, FIG. 7 is a detail sectional view taken along line 7—7 of FIG. 1, FIG. 8 is a diagrammatic view taken along lines 8—8 of FIG. 1 of a sectional view of one of the actuators and an end view of the other, and FIG. 9 is a sectional view taken along line 9—9 of FIG. 8.

Referring now to the drawings, in the illustrative embodiment shown, the deck 11 of the ship has a substantially rectangular opening therein defining a hatchway 12 with a substantially rectangular coaming 13 around such opening rising from the deck 11 of the ship. A ledge 14 extends the length of the hatchway on each side thereof at the upper edge of the coaming 13 and a ledge 15, 15' extends along each end of the hatchway at the upper edge of the coaming, said ledges serving as sealing ledges and the ledges 14 also serving as a track, in the manner hereinafter to be described.

The hatch cover assembly 16 illustratively comprises a pair of substantially rectangular panels A and B. The panels are of sufficient length so that they may extend transversely across the hatchway and are of such width that when in closed position, they will extend from substantially one end of the opening 12 to the other as is clearly shown in FIGS. 2 and 5 to close the hatchway.

As is clearly shown in the drawings, the panel B along the side edge 17 thereof has a pair of spaced outwardly extending portions 18 which illustratively are integral parts of the panel B. Each of the portions 18 has secured thereto a bracket 19 which is pivotally connected as at 21 to the top of an associated upright standard 22 affixed to the deck 11.

Illustratively, each of the panels has a rectangular top plate 24 supported by beam 25 and 26, the beams 25 extending the length of each panel A, B inwardly of the inner edge 27 thereof.

Each of the panels also has a depending skirt plate 28 along each end 29 thereof and a skirt plate 31 along side edges 17, 17', the lower edges 32 of said skirt plates being designed to seat on the associated ledges 14, 15, 15' when the panels are in closed position.

Means are provided to afford a watertight seal between the panels A and B and the hatchway when the panels are in closed position. To this end, each of the panels has an associated gasket A', B' substantially in the form shown in FIG. 3.

Each gasket has a portion W which extends along the lower edge of each skirt plate 28; a portion X which extends along the lower edge of each skirt plate 31; a vertical portion Y which extends along the inner edges 33 of skirt plates 28 and a portion Z which extends along the undersurface of the adjacent inner edges 27 of the top walls 24 of panels A and B.

The gaskets A', B' are held in place by suitable retainers R in such manner that the portions W and X extend slightly beyond the lower edges of skirts 28 and 31; the portion Y extends slightly beyond the inner edges 33 of skirts 28 and the portion Z extends slightly beyond the edges 27 of top plates 24.

Thus, when the panels are inclosed position the portions W and X will be compressed against ledges 14, 15, 15' and the portions Y and Z of the gaskets A', B' will be compressed against each other as shown in FIG. 8, thereby effectively sealing the hatchway.

To facilitate movement of the panels A and B from closed to open position and vice versa in the manner herinafter to be described, the panel A at each end 29 adjacent its outer edge 17' mounts an arm 35 which extends beyond the edge 17' of the panel A and a flanged roller 36 is rotatably mounted on said arm, the roller 36 being adapted to ride along the outer edge of the ledges 14 which define tracks for said rollers.

In order to effect movement of the panels A and B between open and closed position, actuating means are provided located within the confines of the hatch cover panels and operatively connected to adjacent portions of panels A and B. Such actuating means comprise a pair of spaced parallel hydraulic rotary actuators 37, 38 forming an integral unit. Each of the actuators illustratively shown has a casing with mounting brackets 39 and 40 secured together by mounting bolts and nuts. The actuators 37, 38 are of similar construction and therefore only the internal features of actuator 38 will be specifically referred to.

Actuator 38 is preferably of the vane type utilizing pure rotary movement and may be of conventional construction such as, for example, of the type manufactured by Houdaille Industries, Inc. of Buffalo, New York and disclosed in Houdaille Bulletin Hyd-2 15M 4/62. The illustrative embodiment shown in FIGS. 8 and 9 is diagrammatic and is not intended to illustrate all of the details embodied in the actual actuator, for example, bearings and seals are not shown.

As illustrated, in FIGS. 8 and 9, actuator 38 comprises a casing having a body 41 with an inner cylindrical surface 42 and end covers 43 and 44 forming the end walls of the casing with axially aligned openings 45 and 46 therethrough, the covers and body being secured together by suitable conventional means (not shown).

Extending through the casing is an elongated rotor or shaft 50 of circular cross-section having a cylindrical central portion 51 within the body 41, bearing portions 52 and 53 within openings 45 and 46 respectively, and rotor end portiosn 54 and 55 extending outside the casing. Rotor portions 52 and 53 are journally supported by the respective end covers 43 and 44. Portion 51 of the rotor is of slightly larger diameter than bearing portions 52 and 53 to provide annular shoulders 59 and 60 which are maintained in sealing engagement with the respective end walls by conventional means.

Rotor portion 51 has vane means integral therewith and extending outwardly therefrom, said vane means comprising a pair of diametrically opposed vanes 56 extending radially outwardly from the rotor, and maintained in sealing engagement with cylindrical surface 42 of body 41 and the respecive end walls formed by covers 43 and 44 by conventional means, the cylindrical surface 42 and rotor 50 being concentric with one another.

Fixedly secured to and in sealing engagement with the cylindrical surface 42 and the cylinder end walls are divider means, namely two diametrically opposed dividers 58 extending radially inwardly into sealing engagement with the surface of the cylindrical central portion 51 of rotor 50. The rotor, vanes and dividers separate the cylinder into four compartments 61, 62, 63 and 64 each serving as an actuating chamber.

Rotor portion 51 has two separate diametrical passages 76 and 77 therethrough, each passage connecting diametrically opposite chambers, passage 76 providing a fluid connection between chambers 61 and 63, and passage 77 connecting chambers 62 and 64.

As shown in the drawings, FIGS. 8 and 9, end cover 43 has passages 80 and 81 respectively, connecting fittings 83 and 84 on the upper end of the actuator casing with fluid chambers 64 and 61 respectively. Similarly, actuator 37 has fittings 84', 83', in fluid communication with the interior of actuator 37 which is of similar construction as actuator 38.

Fittings 84 and 84' are manifolded by conduits 87 and 88 to fluid conduit 89 while fittings 83 and 83' are manifolded by conduits 91 and 92 to conduit 93.

Conduits 89 and 93 may be connected to any conventional hydraulic system (not shown) comprising, for example, a reservoir, pump, motor and the necessary valving to alternately and respectively connect lines 89 and 93 to a pressure source and to exhaust to control the actuators 37 and 38.

Rotor end portions 54 and 55 extending outwardly beyond end covers 43 and 44 respectively, have external splines 95 thereon extending parallel to the rotor axis. Encompassing each of the splined ends is a hub 96 having a bore with parallel grooves complementary to the splines to receive the latter so that rotor 50 is keyed against relative rotational movement with respect to the hubs 96. Each of the hubs has integral therewith a bracket 97 which bracket is secured by suitable means to beam 25 of hatch cover panel B.

Similarly, actuator 37 has a rotor keyed on each end to a hub 96 having a bracket 97 which is secured to beam 25 of hatch cover panel A.

In order that the panels A and B may move simultaneously when fluid under pressure is applied to the actuators, complementary engaging gears G' and G are secured to the splined ends 54, 55 of each rotor 50.

The actuating units 37, 38 are positioned a sufficient distance below the undersurface of top plates 24 so that the covers can be rotated about their respective pivot lines, namely the axes of the respective actuators, without interference from any portion of the actuating casings. In addition, the actuators 37 and 38 are spaced from each other a sufficient horizontal distance to enable panels A and B to be folded into the booked arrangement illustrated in FIG. 5 with the actuating units within the confines of the covers and with sufficient gap between the skirt plates and beams of the respective panels so that the interior of the panels are accessible and may be reached by a crewman when the panels are in the folded position.

To operate the hatch covers from the closed to the open position, conduit 93 is placed in communication with a source of fluid under pressure and conduit 89 with exhaust. Fluid under pressure will enter passage 80 of actuator 38 and react against the surfaces of vanes 56 in chambers 64 and 62 which are inter-connected by passage 77 thereby rotating shaft 50 and bracket 97 in a counterclockwise direction from the position shown in FIG. 8. Such movement will decrease the volume of chambers 61 and 63 connected together by passage 76, with resultant discharge of fluid therefrom through passage 81 and lines 87, 89. Rotation of shaft 50 will pivot panel B about the axis of rotor 38.

Simultaneously, fluid under pressure will enter the opposed chambers of rotor actuator 37 from line 92 and be discharged from the remaining two chambers into line 88, so as to rotate the rotor of actuator 37 and its corresponding bracket in a clockwise direction from the position shown in FIG. 8 of the drawing, to thereby pivot panel A about the axis of actuator 37.

Since the outer side of panel B is pivotally connected to fixed hinges as at 21, the actuating units 37, 38 will follow an arc-like path while rotating the panels about the respective rotor axes from a closed substantially horizontal side by side position to the folded, vertical position shown in FIG. 4.

As the rotors 50 of said actuators 37 and 38 are connected by the gears G and G', it is apparent that both panels A and B will pivot simultaneously and at the same rate of speed and consequently the adjacent edges 27 of the panels cannot abut and such movement of the panel will be with no relative movement of the gasket portions Y and Z in a vertical plane with respect to each other.

As a result, the portions Y and Z of the gaskets A', B' will move toward and away from each other, but with no rubbing action which would dislodge the gaskets from their retainers with resultant failure of the watertight seal.

Illustratively the panels have bumpers 98 with opposed surfaces, formed for example of suitable resilient material, for engagement with one another in the booked hatch cover position.

The panels A and B are preferably locked in the open position by conventional mechanical means, for example, a pivotal hook 99 on one panel having an end in engagement with an associated retaining ring 100 on the other panel, to prevent inadvertent closing of the covers which could result in injury.

To close the covers, line 89 is connected to fluid under pressure and line 93 is connected to exhaust, and the respective rotors will be rotated in the reverse directions until the panels are in the horizontal position illustrated in FIG. 5. To insure that neither panel will be rotated more than the intended operating arc of 90° relative to its actuator casing, physical stop means are provided to limit relative movement. As illustrated, stops 109 and 110 are affixed to each actuator casing externally thereof and positioned to engage member 111 affixed to the associated hub 96. Since the rotation of each of the actuator rotors in limited by stops 109 and 110, the rotor vanes 56 will not travel the full angular distance between the dividers 58 within the actuator casings and the vanes will not come into contact with the dividers in the illustrated embodiment.

As illustrated in FIG. 1, the actuating units 37, 38 extend only a short distance along the panels. They are positioned centrally of the panels so that the torque can be most advantageously applied to the panels. When the panels are relatively large and heavy, it may be desirable in order to give the hatch cover assembly more stability and to resist twisting of the covers and possible derailment of the wheels due to external forces which may be applied, for example, due to listing of the ship or debris from dunnage left on the trackways, to provide connecting links 112 at opposite ends of the panels. Each connecting link comprises a link member 113 pivotally connected as at 114 to brackets 116 fixed to beams 25. Pivot points 114 are aligned with the respective rotor axes of actuators 37 and 38.

Use of the described actuators in the arrangement shown provides an extremely efficient actuating means of compact size having optimum power for the space occupied. Inasmuch as actuators 37 and 38 utilize rotary movement only, there are no mechanical losses due to mechanical linkage or through converting linear to rotary movement. Moreover, in a vane type actuator the actual volumetric displacement of the vanes is appreciably less than required for other types of actuators to produce a given rotary movement.

In the instant application the two-vane rotors illustrated are particularly desirable and are preferred over a single vane actuator. The double vane actuator provides the required 90° rotation, has a balanced shaft, and is a smaller unit, which unit has no deflection problems, and which unit can readily be located within the confines of the hatch covers.

In the preferred embodiment, the actuating means is substantially completely within the confines of the hatch cover assembly both in the open and the closed cover positions as illustrated in FIGS. 4 and 5. In applications where vertical stowage space is particularly limited, the arrangement herein disclosed has particular utility. Since the actuator does not protrude beyond the panels in the open hatch cover position, for a given vertical stowage space, use of the enclosed actuating means enables use of larger panels than in a hatch cover assembly utilizing actuators which protrude above the confines of the panels in open position. In addition, even where stowage space is not critical, by having the actuating means within the confines of the hatch covers, the actuating means is protected against being struck during loading and unloading of the ship with possible resultant damage to the actuating means. And by having the actuating means substantially within the confines of the hatch cover in closed position, there will be little or no diminishing of the effective cargo space in the hatch and in addition, the likelihood of damage to cargo or actuators by contact with one another during closing of the covers is substantially lessened.

Furthermore, it should be noted from FIG. 5 that the axes of actuating means 37, 38 are positioned substantially in the plane of a line connecting the fixed hinge pivots 21 and the centers of wheels 36 located on the ends of panel A remote from the actuating means. Therefore, when the actuating means commences to move panels A and B from the side by side horizontal closed position, to the booked vertical position, the edge of panel A remote from the fixed hinge 21 will initially move toward the fixed hinge as soon as opening movement begins.

As previously set forth, the forward movement of the panels during opening movement has been a real problem in the art. The present invention by its unique simple arrangement, among other things, substantially reduces if not completely eliminates the forward movement of the covers during initial opening movement and thereby avoids the need for added or special equipment to solve this heretofore problem.

Therefore, it will be apparent that a watertight hatch cover assembly has been provided in which the actuating unit is substantially completely within the confines of the cover, and will provide simultaneous movement of both panels at the same rate of speed and with no rubbing action imparted to the abutting sealing gaskets, wherein the hatch covers alone govern the stowage space and afford protection to the actuating means against accidental damage during loading and unloading of the cargo; which assembly provides actuating means with optimum power for the space occupied, and which enables usage of smaller pumps and hydraulic lines than would otherwise be needed, and which reduces if not completely eliminates forward movement of the panels during initial opening of the hatch covers.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hatch cover assembly for a hatchway comprising a pair of panels adapted to extend over said hatchway in side by saide relationship in closed position and in folded book relationship in open position, actuating means connecting adjacent portions of said panels for effecting pivotal movement of said panels respectively about spaced parallel axes fixed relative to each other, said actuating means comprising a pair of actuators each having a rotary member defining one of said spaced parallel axes, each of said rotary members being directly connected to an associated panel to provide the connection between the actuating means and said panel, complementary gear means fixed relative to said rotary members respectively and directly engaging each other, whereby when said panels are moved about their respective pivotal axes they will move simultaneously and at the same rate of speed.

2. A hatch cover assembly for a hatchway comprising a pair of hatch cover panels adapted to extend over said hatchway, said panels adapted to lie in side by side substantially horizontal relation in the closed position and standing in folded generally parallel substantially vertical relation in the open position, actuating means connected to adjacent portions of said panels for effecting pivotal movement thereof about spaced parallel axes respectively between said closed and open positions, said actuating means comprising a pair of hydraulic rotary actuators forming an integral unit, said respective actuators having individual rotors with spaced parallel axes fixed relative to each other and coaxial with the pivotal axes of said panels, means connecting one of said rotors to its adjacent associated panels, means connecting the other of said rotors to its adjacent associated panels, complementary gear means secured respectively to said rotors and directly engaging each other to provide simultaneous movement of said panels at the same rate of speed.

3. A hatch cover assembly as set forth in claim 2 in which said hatchway has a sealing rail around the periphery thereof, each of said panels has a peripheral gasket having portions adapted to engage said sealing rail and also having portions adapted to engage the corresponding portion of the other gasket, whereby when said panels are in closed position a watertight seal will be effected.

4. A hatch cover assembly as set forth in claim 2 wherein each of said panels comprises a rectangular top plate, said top plates lying in side by side relation across the hatchway in substantially a horizontal plane in closed position, said actuating means being located below the top plates in the closed position of the hatch covers and positioned to rotate the covers between closed and open positions, said actuator axes being spaced from each other a sufficient distance so that in the open hatch cover position the actuating means is located completely within the confines of said panels.

5. A hatch cover assembly as set forth in claim 4 in which said actuating means are located substantially withing the confines of the panels in closed position.

6. A hatch cover assembly for a hatchway in the deck of a ship comprising a pair of panels adapted to extend over said hatchway, said panels lying in side by side relation in substantially a horizontal plane when in closed position, means pivotally mounting a side of one of said panels with respect to the deck of the ship, hydraulic actuating means connecting adjacent sides of said panels for effecting folding movement thereof between closed and open positions, a roller at each end adjacent the opposite side of the other panel, a track positioned on each side of the hatchway on which said rollers ride to guide the opposite side of said other panel, said actuating means comprising an integral unit having a pair of spaced parallel rotors, gear means fixed to each of said rotors, said gear means directly engaging each other and means connecting each of said rotors to its associated adjacent panel.

7. A hatch cover assembly for a hatchway comprising first and second hatch cover panels adapted to extend over said hatchway, said panels adapted to lie in side by side relationship in the closed position and standing in folded generally parallel relationship in the open position, actuating means connected to adjacent portions of said first and second panels for effecting pivotal movement of said panels about respective axes, said axes being spaced, parallel and fixed relative to each other, said actuating means comprising first and second hydraulic rotary actuators adjacent said first and second panels respectively, each of said actuators having a casing member and a rotor member, means connecting one of the members of said first actuator to said first panel, means connecting one of said members of said second actuator to said second panel, complementary gear means secured to each of said connected members respectively and directly engaging each other, and means connecting the other of said members of the respective actuators to each other.

8. A hatch cover assembly for a hatchway comprising a pair of hatch cover panels adapted to extend over said hatchway, said panels adapted to lie in side by side substantially horizontal relation in the closed position and standing in folded generally parallel substantially vertical relation in the open position, actuating means connected to adjacent portions of said panels for effecting pivotal movement thereof about spaced parallel axes between said closed and open positions, said actuating means comprising a pair of hydraulic rotary actuators forming an integral unit, said respective actuators having individual rotors with spaced parallel axes fixed relative to each other, and coaxial with the pivotal axes of said panels, means connecting one of said rotors to its adjacent associated panel, means connecting the other of said rotors to its adjacent associated panel, complementary engageing gear means secured respectively to said rotors and directly engaging each other to provide simultaneous movement of said panels at the same rate of speed, each of said actuators comprising a casing having a cylindrical chamber therein, each rotor having a circular cross section journally supported by opposite ends of said casing, said rotor being concentric with said cylindrical chamber and having generally axially directed outwardly extending vane means within said casing and in sealing engagement with the walls of said chamber, axially extending divider means integral with said casing and extending inwardly into sealing engagement with said rotor, said rotor, vane means and divider means forming working compartments within said chamber, means for connecting alternate compartments to fluid under pressure and to exhaust respectively for effecting movement of said panels, each of said rotors having end portions outside opposite ends of its casing, and bracket means to connect the rotor end portions of the respective actuators with the respective panels to key the associated rotors and panels together against relative rotational movement with each other, said end portions extending beyond the bracket means and said gear means are mounted on said extending end portions.

9. A hatch cover assembly as set forth in claim 8 wherein each of said actuators is adapted to rotate its associated panel through an operating arc between its open and closed portions, and mechanical stop means to prevent movement of each rotor outside of its operating arc.

References Cited by the Examiner

UNITED STATES PATENTS

| 2,753,827 | 7/56 | Sabin | 114—201 |
| 2,855,038 | 10/58 | Greer | 160—188 |
| 2,930,434 | 7/60 | Englesson | 160—188 |
| 3,104,643 | 9/63 | Vallet | 114—202 |

FOREIGN PATENTS

| 44,870 | 7/61 | Poland. |

MILTON BUCHLER, Primary Examiner.

ANDREW H. FARRELL, Examiner.

UNITED STATES PATENT OFFICE
CERTIFICATE OF CORRECTION

Patent No. 3,211,122                      October 12, 1965

Cecil R. Barlow

It is hereby certified that error appears in the above numbered patent requiring correction and that the said Letters Patent should read as corrected below.

Column 7, line 28, for "saide" read -- side --; column 9, line 11, for "portions" read -- positions --.

Signed and sealed this 25th day of October 1966.

(SEAL)
Attest:

ERNEST W. SWIDER                      EDWARD J. BRENNER
Attesting Officer                      Commissioner of Patents